Nov. 26, 1968 J. GREEN, JR 3,412,767
SABRE SAW CHUCK
Filed June 30, 1966 2 Sheets-Sheet 1
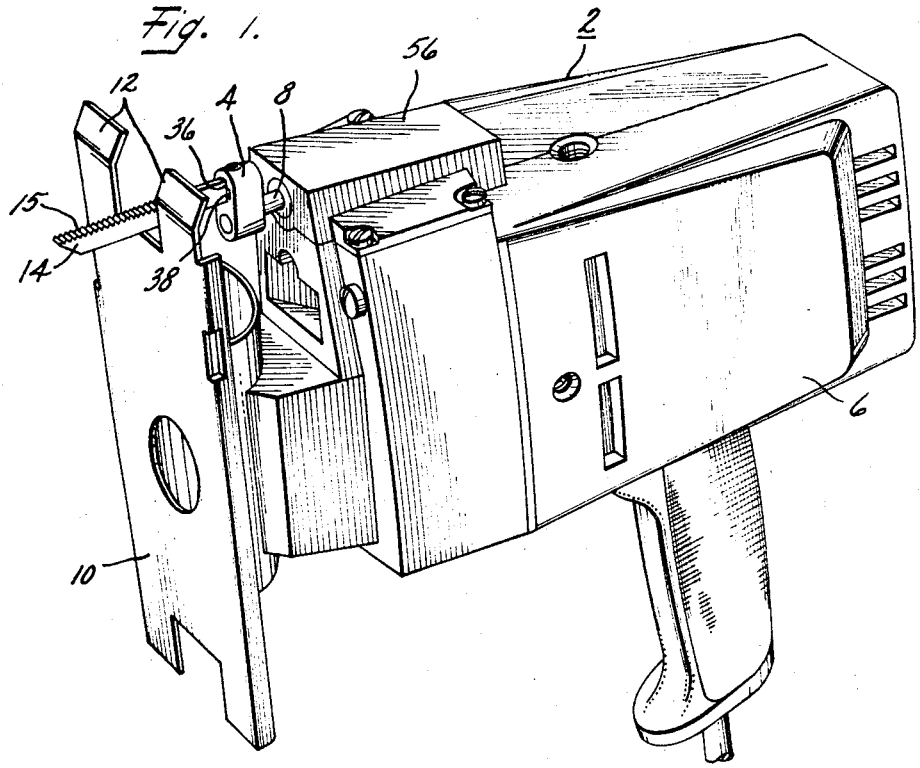
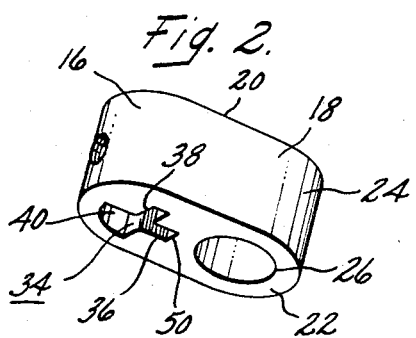
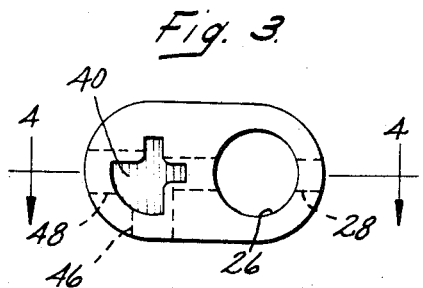
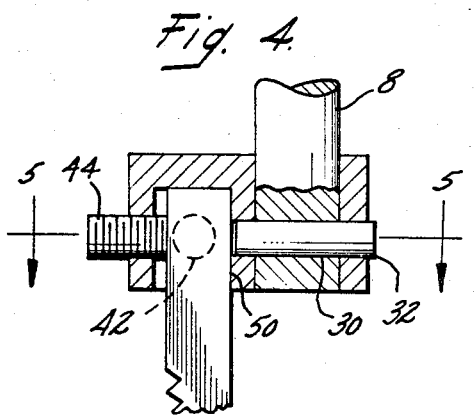
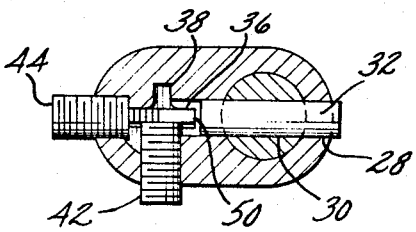
Inventor:
James Green Jr.
by Leonard J. Platt
Attorney

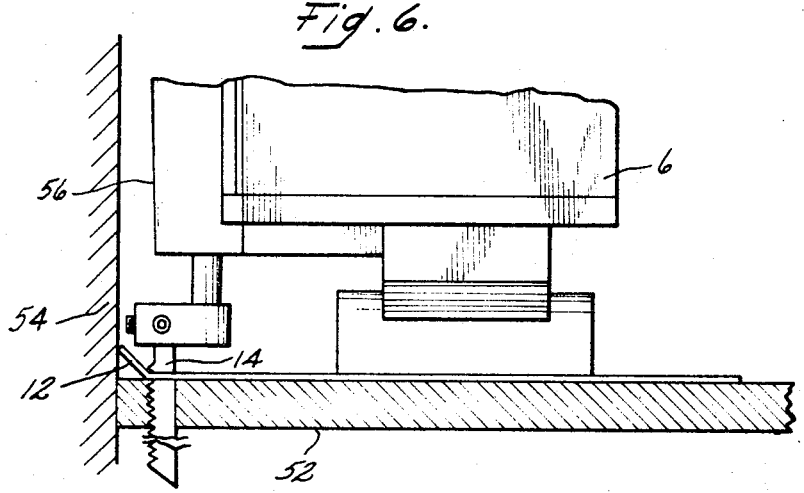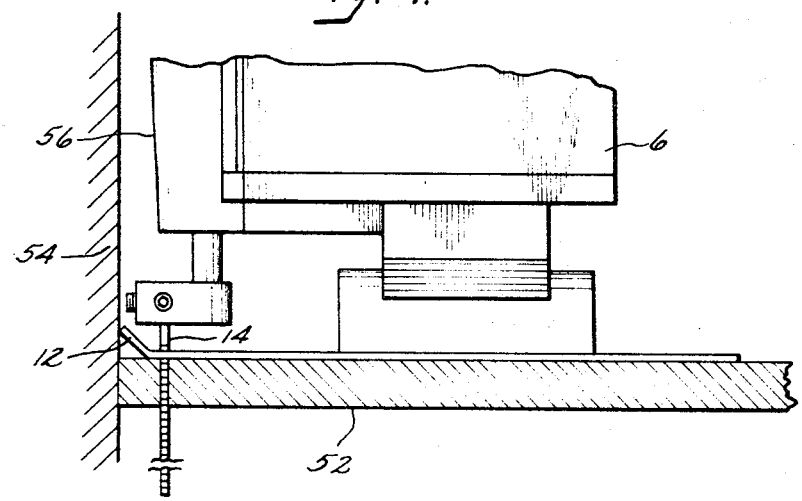

United States Patent Office 3,412,767
Patented Nov. 26, 1968

3,412,767
SABRE SAW CHUCK
James Green, Jr., Spencerport, N.Y., assignor to General Electric Company, a corporation of New York
Filed June 30, 1966, Ser. No. 561,967
4 Claims. (Cl. 143—68)

ABSTRACT OF THE DISCLOSURE

This invention discloses a sabre saw with a chuck of unique and simple construction that permits dual positioning of a saw blade in an offset arrangement for cutting close to a vertical surface.

---

This invention relates to a sabre saw and, more particularly, to a chuck for coupling a sabre saw blade to a reciprocating drive shaft.

Sabre saws are used for a variety of sawing operations, and for example, they have been constructed to enable an operator to make a flush cut in a floor up to within a ¼" or ½" from a wall, and then make a cut in the floor generally parallel to the wall and virtually flush to the vertical surface of the wall. In prior art devices, flush cuts and parallel cuts have been achieved by use of specially designed and shaped blades. Chucks have also been designed to hold a saw blade generally perpendicular to its normal position to enable a parallel cut to be made virtually flush to the vertical surface of a wall. A simple, low cost chuck for holding a conventional sabre saw blade far enough forwardly to make a cut flush to a wall or vertical surface and for holding a conventional sabre saw blade generally perpendicular to its normal position for making a cut parallel to a wall is especially desirable.

Accordingly, it is a primary object of this invention to provide a unique, easily manufactured sabre saw chuck having a minimum number of parts for holding a sabre saw blade to perform a variety of sawing operations.

It is a further object of this invention to provide a sabre saw chuck which is reliable and easy to use for making flush and parallel cuts as well as standard type cuts with conventional readily obtainable blades.

In accordance with one aspect of my invention, a sabre saw chuck is fixed to a reciprocating drive shaft. A first longitudinal slot having fixed spaced walls is formed in the chuck body portion for receiving the shank end of a sabre saw blade to hold the blade in its normal position with its cutting surface extending forwardly, and a second similar slot intersects and is transverse to the first slot for holding the blade perpendicular to its normal position. In addition, the intersecting slots are positioned in a forward portion of the chuck in front of the reciprocating drive shaft. With this construction, a conventional sabre saw blade may be quickly and securely fastened in either one of the saw chuck slots. A flush cut may be made with the saw blade in the first mentioned slot; and in order to make a parallel cut, it is merely necessary to remove the blade and insert it in the other slot. Thus, a very simple, yet effective, chuck is provided for holding a sabre saw blade to perform a variety of sawing operations without using special tools or additional parts.

Other objects and attendant advantages of this invention will be apparent when taken in conjunction with the accompanying drawing in which:

FIG. 1 is a perspective view of a sabre saw embodying my invention;

FIG. 2 is a perspective view showing my unique chuck construction;

FIG. 3 is a bottom plan view of the chuck shown in FIG. 1;

FIG. 4 is a sectional view on the line and in the direction of the arrows 4—4 of FIG. 3 showing the chuck fixed to a drive shaft;

FIG. 5 is a sectional view on the line and in the direction of the arrows 5—5 of FIG. 4;

FIG. 6 is a partial schematic view showing the disposition of the sabre saw for making a flush cut generally perpendicular to a wall; and FIG. 7 is a partial schematic view illustrating the sabre saw making a cut parallel to a wall and virtually flush to the vertical surface of the wall.

Referring now to FIG. 1, there is shown a sabre saw 2 equipped with my unique chuck 4. As shown, the sabre saw includes a power unit 6 for reciprocating a drive shaft 8, and a mounting table 10 which is adjustably fixed to the power unit for supporting the saw on a work surface. The table 10 may be moved to a forward position with respect to the power unit to provide stability for making normal cuts, or to the rear position shown in FIG. 1 to enable flush cuts to be made close to a wall. In the rear position illustrated, projecting fingers 12 of the table are approximately ¼" in front of the cutting surface of a sabre saw blade 14.

Chuck 4 is preferably formed of sintered metal or other suitable material having high strength and stiffness. It is a one-piece integral body portion that may include the usual set screws and the chuck includes a forward portion 16, a rear portion 18, a generally flat top wall 20, a flat bottom wall 22, and a curved side wall 24. As shown more particularly in FIGS. 2 and 5, a generally cylindrical bore 26 is formed in the rear portion of the chuck for receiving a reciprocating drive shaft 8. A hole 28 is formed in the chuck and a complementary hole 30 is formed in the drive shaft for receiving a compression spring pin 32 in order to rigidly fix the chuck 4 to the reciprocating drive shaft 8.

A recess 34 uniquely forming mutually intersecting slots 36 and 38 having fixed spaced side walls in the chuck body portion as best shown in FIG. 2, extends upwardly from the bottom wall 22 of the chuck. As shown more particularly in FIGS. 2 and 3, a quadrant recess 40 is provided at the front left quadrant between and interconnecting the mutually intersecting slots. By this arrangement, the core which is used to form the sintered metal chuck may be more ruggedly constructed and clearance is provided for the set screws for holding the blade.

Longitudinal slot 36 may receive a blade 14 between its spaced walls, for making a forward cut, as shown in FIG. 1, and the blade 14 may also be reversed in slot 36 with its cutting surface 15 facing rearwardly in order to make a rearward cut. In addition, blade 14 may be positioned in similar slot 38 with its cutting surface facing to the right for making a right cut, or its cutting surface 15 facing to the left for making a left cut.

Saw blades are quickly and securely fastened in either one of the saw chuck slots 36 and 38 by two set screws 42 and 44 to apply force at right angles to clamp the blade in each slot. As shown more particularly in FIGS. 3 and 4, threaded holes 46 and 48 are cut into the side wall 24 of the chuck 4 body portion and extend into quadrant recess 40 for receiving set screws 42 and 44, respectively.

When a saw blade is placed within longitudinal slot 36, set screw 42 securely holds the flat portion of the blade against the left wall of slot 36, as viewed in FIG. 1, while set screw 44 urges the thin wall portion of the blade against the rear end wall 50 of slot 36. It can be appreciated that when the blade 14 is located in slot 38, set screw 44 will hold the flat surface of the blade against the rear wall of slot 38, and set screw 42 will hold the narrow edge surface of the blade against the left end wall of slot 38.

From the foregoing description, it will be appreciated that a sabre saw blade may be held in chuck 4 in any one of four positions to provide a variety of sawing operations. If it is desired to perform a standard straight ahead cut, the blade is positioned within slot 36 as shown in FIG. 1 and the table 10 may be positioned forwardly in order to provide a maximum amount of stability. When it is desired to make a flush cut, the table 10 is moved to its rearward position shown in FIG. 1, and the saw blade is arranged in slot 36 with its cutting surface facing forwardly. In this position, as shown in FIG. 6, a flush cut may be made in a floor 52 up to within ¼″ or ½″ from a wall 54. As shown in FIG. 6, it can be appreciated that since the chuck slots are positioned in front of the reciprocating drive shaft 8, the cutting surface of a conventional sabre saw blade is located approximately in line with a front wall 56 of power unit 6 and only a fraction of an inch behind projecting fingers 12 of the table 10. This arrangement permits the user to make a saw cut virtually flush with the edge of the wall 54 or a raised molding or other obstruction which may be encountered by fingers 12.

If it is desired to make a parallel cut virtually flush to the vertical surface of wall 54, it is merely necessary to remove the blade 14 and insert it within slot 38. Clearly, with the cutting surface of the blade facing left, as viewed in FIG. 7, a cut may be made to the left virtually flush and parallel to wall 54 with relative ease and comfort. Alternately, the blade may be inserted in slot 38 with its cutting surface facing to the right for making a parallel cut to the right. As previously indicated, the blade may also be positioned within the slot 36 with its cutting surface facing rearwardly for making a cut away from wall 54.

It has also been observed that it is sometimes desirable to place a sabre saw blade in its alternate position within slot 38 for cutting off an inch or so of a work piece. When used in this manner, it can be appreciated that the major portion of table 10 will rest on the major portion of the work piece so that the power unit may be slid sidewise with relative ease and comfort along the major portion of the work piece as an inch or so of the work piece is cut away.

In view of the foregoing, it can be appreciated that my unique chuck construction utilizes a minimum number of parts which may be readily formed and assembled to each other. A principal part of this unique combination is a one-piece sintered metal chuck 4 which is formed to provide a number of portions including slots 36 and 38 to perform a plurality of functions. It can also be appreciated that the chuck furnishes a rigid construction for securely holding a conventional sabre saw blade in any one of a plurality of positions for making flush and parallel cuts as well as standard type cuts with standard easily obtainable blades. Moreover, it can be seen that with my improved construction the saw blade is positioned ahead of the reciprocating shaft 8 and, thus, the cutting face of the saw blade is readily visible to the operator.

While there has been shown and described a particular embodiment of my invention, it will be obvious to those skilled in the art that various changes and modifications can be made therein without departing from the invention. Therefore, it is aimed in the appended claims to cover all such changes and modifications as fall within the true spirit and scope of the invention.

What I claim as new and desire to secure by Letters Patent of the United States is:

1. A sabre saw comprising:
   (a) a drive mechanism including means mounted for reciprocating movement;
   (b) a saw blade chuck having a body portion carried by said reciprocating means;
   (c) means defining a first longitudinal slot formed by fixed spaced walls in said chuck body portion for receiving one end of a sabre saw blade;
   (d) means defining a second slot formed by fixed spaced walls intersecting and transverse to said first slot for holding a sabre saw blade;
   (e) a quadrant recess disposed between and interconnecting the two slots; and
   (f) means extending into said recess to apply force at right angles on said blade to clamp said blade in each slot;
   (g) said slots being positioned in a forward portion of said chuck body portion in front of the reciprocating drive shaft so that the sabre saw may be used to make a flush cut and a parallel cut.

2. A sabre saw comprising:
   (a) a drive mechanism including means mounted for reciprocating movement;
   (b) a saw blade chuck having a body portion carried by said reciprocating means;
   (c) means defining a first longitudinal slot formed by fixed spaced walls in said chuck body portion for receiving one end of a sabre saw blade;
   (d) means defining a second slot formed by fixed spaced walls intersecting and perpendicular to said first slot for holding a sabre saw blade; and
   (e) a pair of set screws disposed at right angles to each other and extending into said recess to apply force on said blade to clamp said blade in each slot.

3. A sabre saw as defined in claim 2 wherein said chuck body portion includes a forward portion and a rearward portion, the rearward portion of said chuck being connected to said reciprocating means and the slots being provided in the forward portion of said chuck so that said saw blade may extend forwardly of said reciprocating means to permit the saw blade to make a cut close to a wall.

4. A sabre saw comprising:
   (a) a drive shaft mounted for reciprocating movement;
   (b) a saw blade chuck having a body portion formed of sintered metal and having a forward portion, a rear portion, a top wall, a bottom wall and a side wall;
   (c) a cylindrical bore extending completely through the rear portion of said chuck for receiving said drive shaft;
   (d) a first hole extending through the side wall of said chuck intersecting said cylindrical bore;
   (e) a second hole extending through said drive shaft;
   (f) a spring pin positioned within said holes for rigidly fixing said chuck to said drive shaft;
   (g) a first longitudinal slot formed by fixed spaced walls in the forward portion of said chuck extending through said bottom wall for receiving one end of a sabre saw blade;
   (h) a second slot formed by fixed spaced walls intersecting and transverse to said first slot for receiving one end of a sabre saw blade; and
   (i) set screws extending through the side wall of said chuck intersecting said slots to clamp a sabre saw blade in position.

References Cited

UNITED STATES PATENTS

| | | | |
|---|---|---|---|
| 2,735,685 | 2/1956 | Karr | 143—156 X |
| 2,954,808 | 10/1960 | Sweeney et al. | 143—68 |
| 3,186,726 | 6/1965 | Wilhelm | 143—156 X |
| 3,260,290 | 7/1966 | Happe et al. | 143—156 X |

FOREIGN PATENTS 742,289  11/1943  Germany.

DONALD R. SCHRAN, *Primary Examiner.*